United States Patent [19]
Sherepa et al.

[11] Patent Number: 5,277,294
[45] Date of Patent: Jan. 11, 1994

[54] METHOD AND APPARATUS FOR TRANSFERRING OBJECTS BETWEEN CONVEYORS

[75] Inventors: Andrew Sherepa, Duluth, Minn.; Mark Berg, Foxboro, Wis.; Rod Ledoux, Duluth, Minn.; Lennie Polecheck, Superior, Wis.

[73] Assignee: Luigino's, Inc., Duluth, Minn.

[21] Appl. No.: 898,252

[22] Filed: Jun. 15, 1992

[51] Int. Cl.⁵ .............................................. B65G 25/00
[52] U.S. Cl. ................................................... 198/429
[58] Field of Search ................................ 198/429, 430

[56] References Cited

U.S. PATENT DOCUMENTS

| | | | |
|---|---|---|---|
| 1,289,208 | 12/1918 | Lents | 198/429 |
| 3,340,992 | 9/1967 | Seragnoli | 198/429 |
| 4,104,984 | 8/1978 | Kellermann et al. | 198/429 |
| 4,343,390 | 8/1982 | Laub | 198/429 |
| 4,371,076 | 2/1983 | Nakao | 198/429 |
| 4,667,808 | 5/1987 | Mastak | 198/429 |

Primary Examiner—Joseph E. Valenza
Attorney, Agent, or Firm—Kinney & Lange

[57] ABSTRACT

A method and apparatus for transferring products from one conveyor to another. Guide rails direct products into substantial contact with a push bar. The push bar pushes the products from one conveyor belt to another conveyor belt in a smooth and efficient manner, thereby significantly reducing the possibility of damaging the products.

14 Claims, 7 Drawing Sheets

METHOD AND APPARATUS FOR TRANSFERRING OBJECTS BETWEEN CONVEYORS

FIELD OF THE INVENTION

This invention relates in general to removing objects from a conveyor. More particularly, it relates to a method and apparatus for transferring objects from one conveyor to another.

BACKGROUND OF THE INVENTION

In a "conveyor belt" production lines, it is often impossible or impractical to run a single conveyor through each station in the production line. Accordingly, production lines typically include more than one conveyor, and thus, there is a need for a way to transfer objects from one conveyor to another.

In the past, objects have been transferred between separate conveyors by hand. Hand transfer, however, is extremely labor intensive and costly. In high volume production lines, hand transfer can slow down production speed significantly. Other alternatives include allowing objects on one conveyor to fall to the next conveyor, or mechanically "hitting" the objects to knock them to the next conveyor. With either of these methods it is difficult to control the flow path of the objects, and there is substantial potential for damage.

Thus, it is an object of this invention to provide an automatic, efficient and smooth method and apparatus for transferring items from one conveyor to another conveyor.

One embodiment of the invention features a push bar located adjacent one conveyor. Guide rails steer objects moving on the one conveyor along the push bar. The push bar then pushes or guides the objects across the one conveyor to an adjacent conveyor.

Thus, it is an advantage of the invention that objects are moved between conveyors by pushing, and thus, the transfer is smooth and efficient with little potential for damage.

SUMMARY OF THE INVENTION

To achieve the foregoing objects, features and advantages, the inventive apparatus for transferring objects from a first conveyor to a second adjacent conveyor comprises an actuator capable of moving from a first extreme position to a second extreme position. A push bar is attached to the actuator and located above and adjacent to the first conveyor. Guide means guides or directs objects moving on the first conveyor into substantial contact with the push bar. By moving the actuator from its first extreme position to its second extreme position, the push bar is moved over and across the first conveyor, thereby pushing objects from the first conveyor to the second conveyor.

BRIEF DESCRIPTION OF THE DRAWINGS

A greater appreciation of the objects, features and advantages of the present invention may be understood by the following detailed description taken in conjunction with the attached drawings wherein.

DETAILED DESCRIPTION OF THE PREFERRED EMBODIMENT OF THE INVENTION

FIGS. 1 through 4c illustrate a transfer apparatus 6 embodying the present invention. The transfer apparatus 6 is mounted to a conveyor system 8, which includes a conveyor belt 10. A second conveyor system 12 also includes a conveyor belt 14, which is located adjacent to the conveyor belt 10. In the disclosed embodiment, the conveyor belt 14 moves in a direction that is generally perpendicular to the direction of the conveyor belt 10.

Individually, many of the elements of the transfer apparatus 6 are known. However, it is the unique combination of these elements that forms the disclosed embodiment of the invention. This detailed description discusses the overall functions performed by each element and how these elements cooperate in the inventive apparatus and method. The following list sets forth several elements of the transfer apparatus 6, along with suitable commercial devices for performing the elements' functions.

| ELEMENT | COMMERCIAL DEVICE |
| --- | --- |
| Transceiver (22) | 42RLU Photoswitch 4000B |
| Electric Hoses (26, 28) | ULTRATITE TM One Half Inch Hose |
| Central Controller (32) | CARLON TM Power Control Box |
| Air Valve (36) | SPEEDAIRE TM Air Valve |
| Lubricator (40) | SPEEDAIRE TM Lubricator |
| Pressure Regulator (42) | NORGREN TM Air Pressure Regulator |
| 12 inch Air Driven Cylinder (56) | BIMBA TM Stainless Air Cylinder |
| 6 inch Air Driven Cylinder (64) | AURORA TM Pneumatic Air Cylinder |

The preferred embodiment of the invention is disclosed in connection with the production of frozen pasta entrees packaged in flexible containers. After the containers have left their final assembly station (not shown), they are transferred from conveyor belt 10 to conveyor belt 14 which feeds into a freezer (not shown). The assembly stations on the conveyor belt 10 operate on one product after another in a single file line. However, the conveyor belt 14 transports products to the freezer in rows. Thus, the transfer apparatus 6 also facilitates a transfer from the "single file" conveyor 10 to the "row by row" conveyor 14.

The conveyor belt 14 does not need to be at the same horizontal level as the conveyor belt 10. However, conveyor belt 14 should not be so far below conveyor belt 10 that the products could flip over or tumble before they reach conveyor belt 14. In the disclosed embodiment, conveyor belt 14 is approximately ½ inch below conveyor belt 10.

In order to facilitate a smooth transfer between the conveyor belts, 10 and 14, a horizontal low-friction stainless steel plate 17 is mounted to one side of the conveyor system 8 via a set of braces 18. The plate 17 is approximately ¼ inch below conveyor belt 10 and approximately ¼ inch above conveyor belt 14.

The transfer apparatus 6 includes means for detecting the presence of products on conveyor belt 10. In the preferred embodiment, the means for detecting includes a transceiver 22 and reflector 24. The transceiver 22 sends a light signal or beam to the reflector 24 which reflects the beam back to the transceiver 22. Products moving on the conveyor belt 10 break the beam as they reach the transceiver 22 and reflector 24.

The transceiver 22 includes programmable controls which are set to count the number of products that pass the transceiver 22. After a predetermined number of products have passed, a detection signal is sent to the central controller 32 via electric hose 26. The central controller 32 then signals air valve 36 via electric hose 28. The hoses 26, 28 are each made from an electric wire surrounded by a thick rubber hose, which allows safe electrical connection in a wet environment. The transceiver's programmable controls may also be set to delay the detection signal on electric hose 26 until the last product has moved to the push bar 60.

Figure 1:
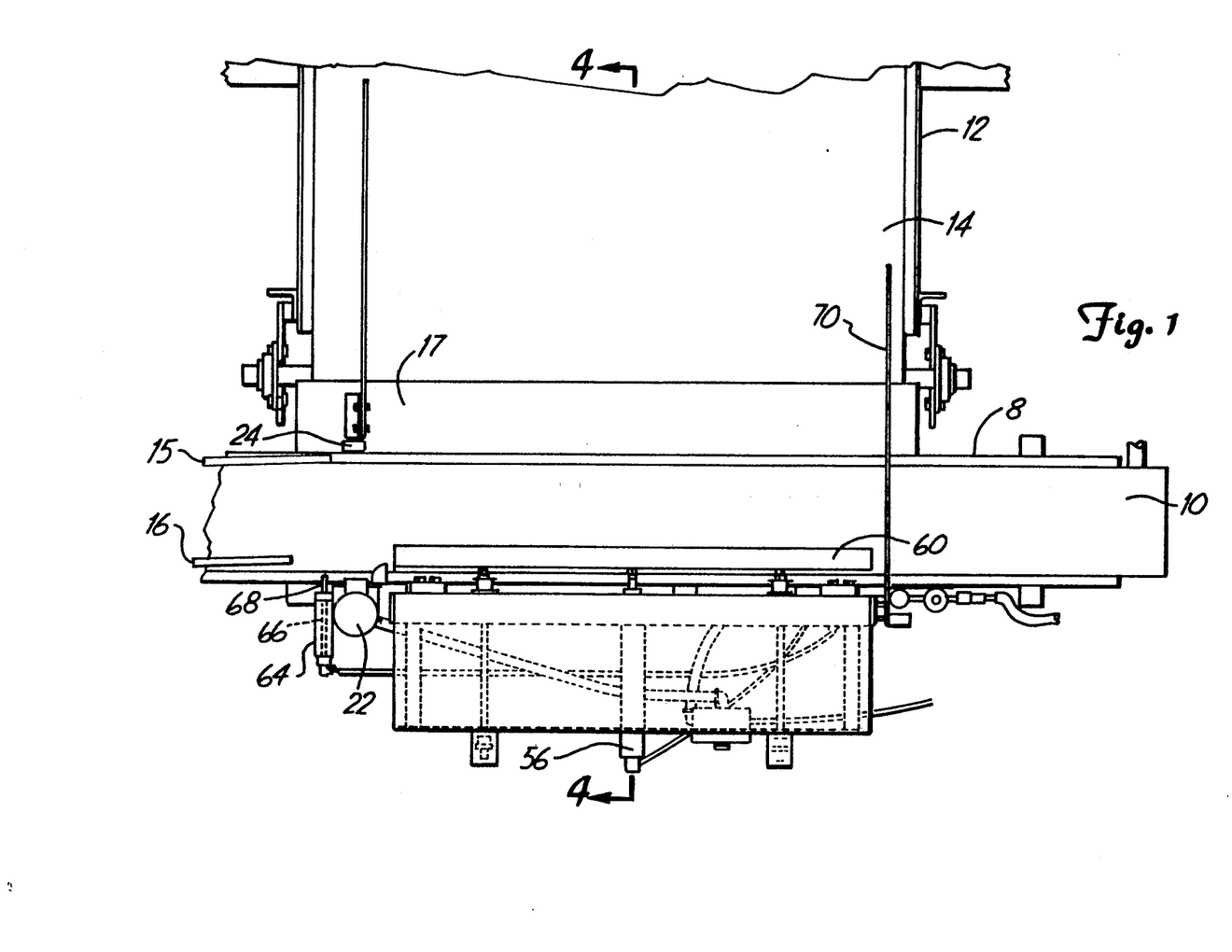
FIG. 1 illustrates a plan view of one embodiment of the present invention.
Figure 2:
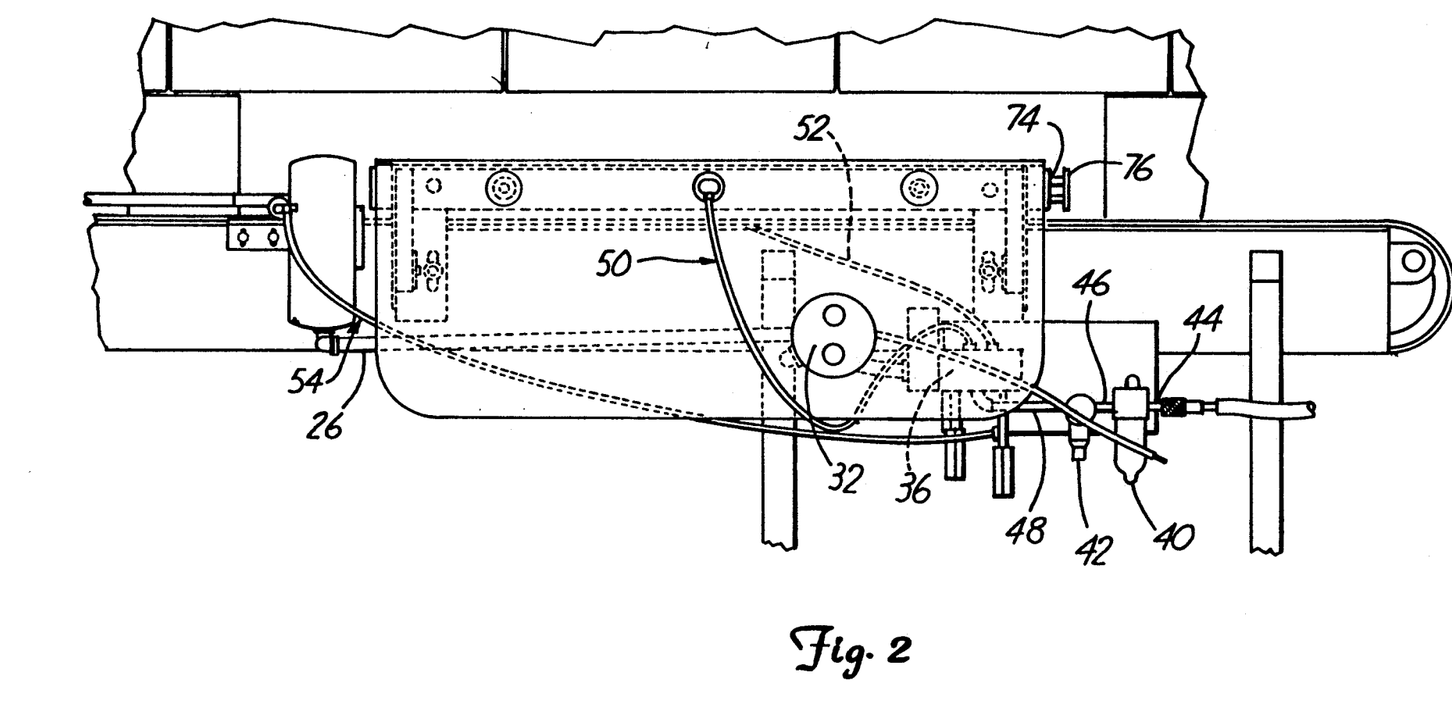
FIG. 2 illustrates a front view of the embodiment illustrated in FIG. 1.
Figure 3:
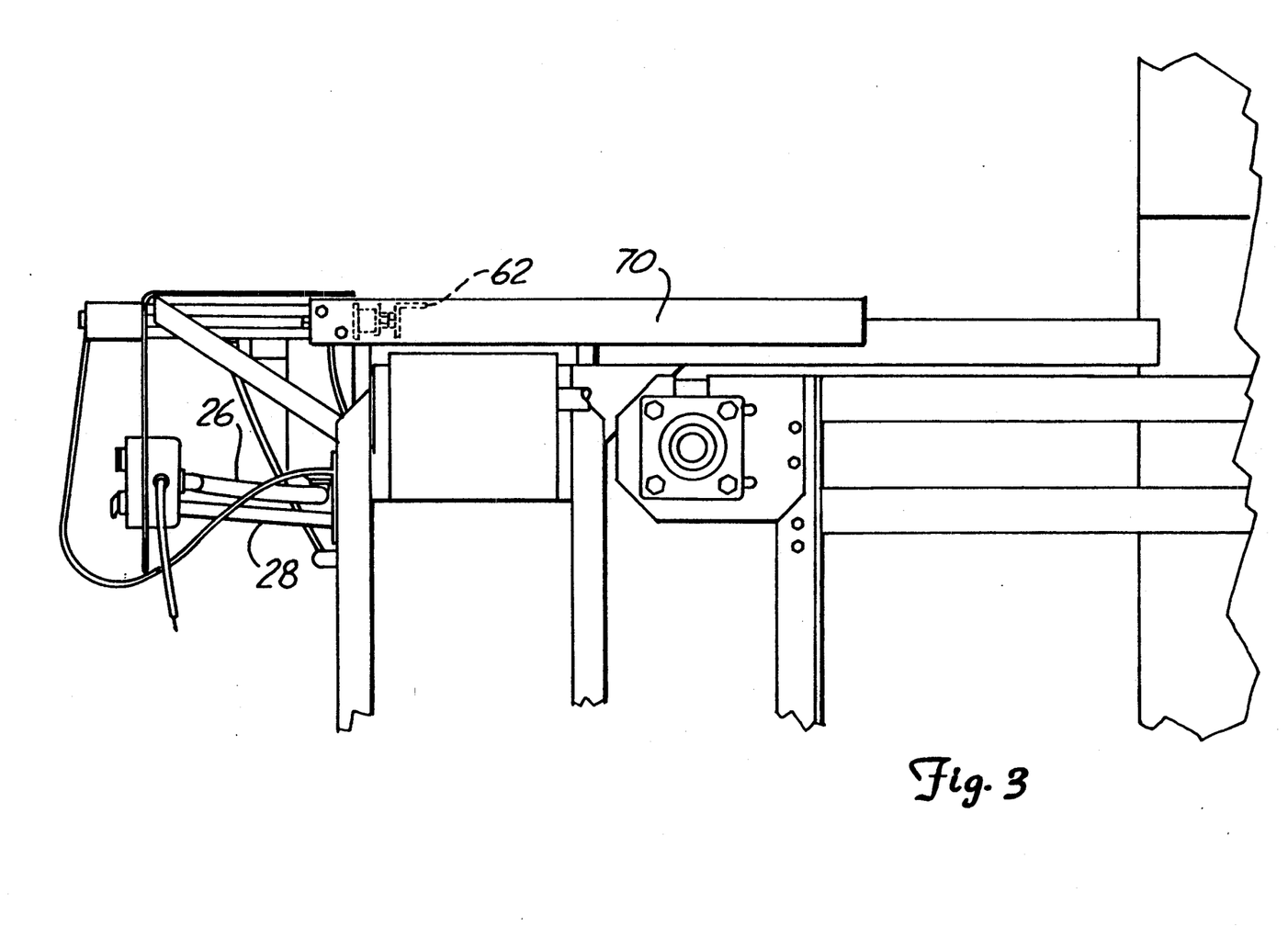
FIG. 3 illustrates a side view of the embodiment illustrated in FIG. 1.

Guide rails 15, 16 are mounted by suitable means to the conveyor system 8 upstream from the push bar 60. As seen in FIG. 1, the guide rails 15, 16 are angled to direct products moving on the conveyor 10 into substantial contact with the push bar 60. A guard rail 70 is located immediately downstream from the push bar 60 to prevent products from traveling past the push bar 60 and over the end of the conveyor belt 10.

Air valve 36 is connected at its input port to pipe 48, which supplies compressed air from a pressure regulator 42. The air valve 36 is connected at its output ports to air lines 50, 52 and 54. Line 50 is connected to a top section of cylinder 56, and line 52 is connected to a bottom section of cylinder 56. Line 54 is connected to a top section of cylinder 64. When the air valve 36 receives the detection signal from hose 28, the air valve opens to lines 50 and 54, thereby introducing compressed air into the top sections of the cylinders 56 and 64.

In the disclosed embodiment, high pressure compressed air is supplied by compressors (not shown) in other parts of the production plant. The high pressure air is passed through a lubricator 40, which injects the air with a mist of oil. The air then travels via pipe 46 to an air pressure regulator 42, which decreases the air to whatever pressure is needed in the cylinders 56, 64. In the disclosed embodiment, the air pressure held in the air valve 36 is approximately 20 pounds. The compressed air then travels via pipe 48 to the air valve 36, which holds the air until the detection signal appears on electric hose 28 and opens the air valve 36 to air lines 50 and 54.

The transceiver 22, reflector 24, and cylinders, 56 and 64, of the transfer apparatus 6 may be mounted to the conveyor system 8 in any stable manner. In the disclosed embodiment, the transfer apparatus 6 is mounted by a series of brackets 74 and screws 76 (only selected screws and brackets are numbered in the figures).

Figure 4A:
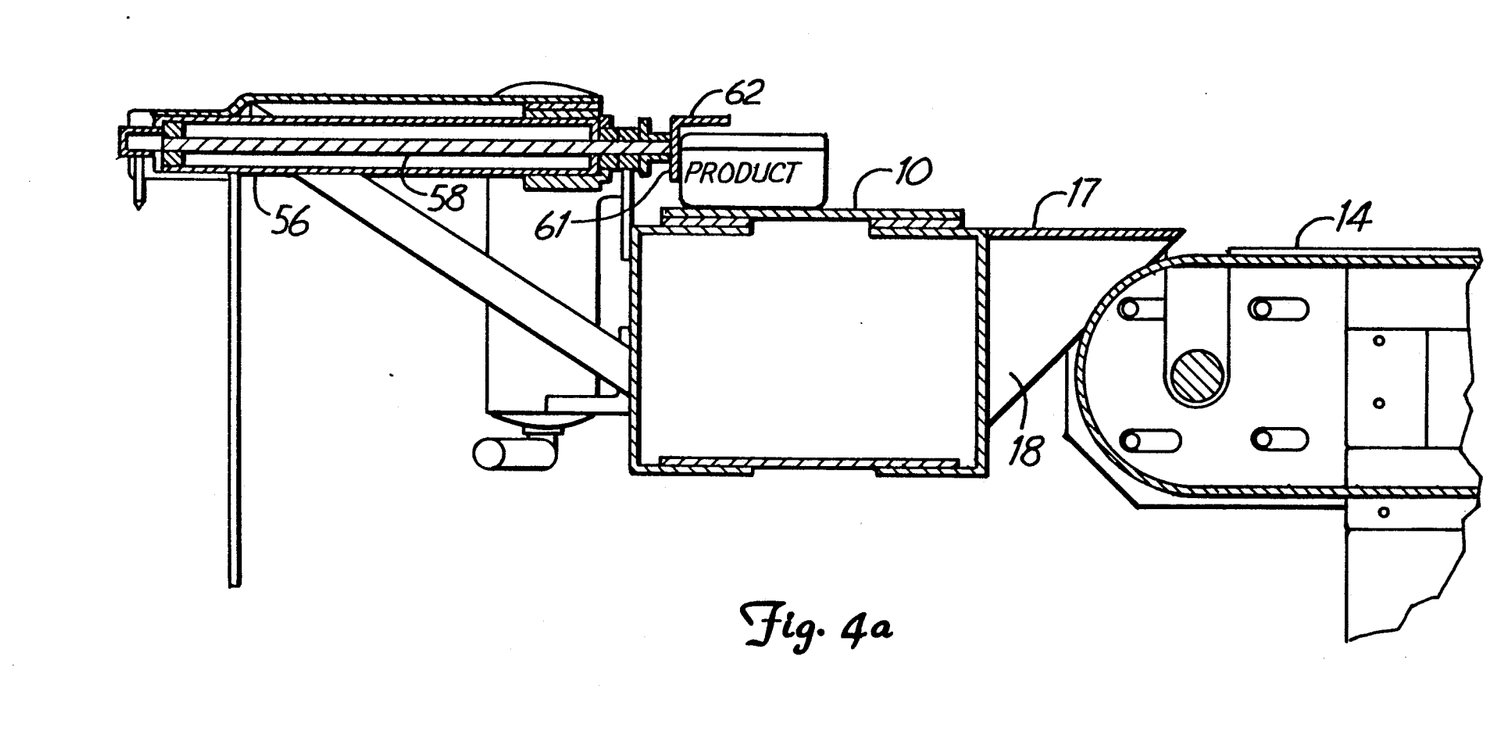
FIG. 4a, 4b and 4c are partial sectional views of the disclosed embodiment taken along line 4—4 in FIG. 1.
Figure 4B:
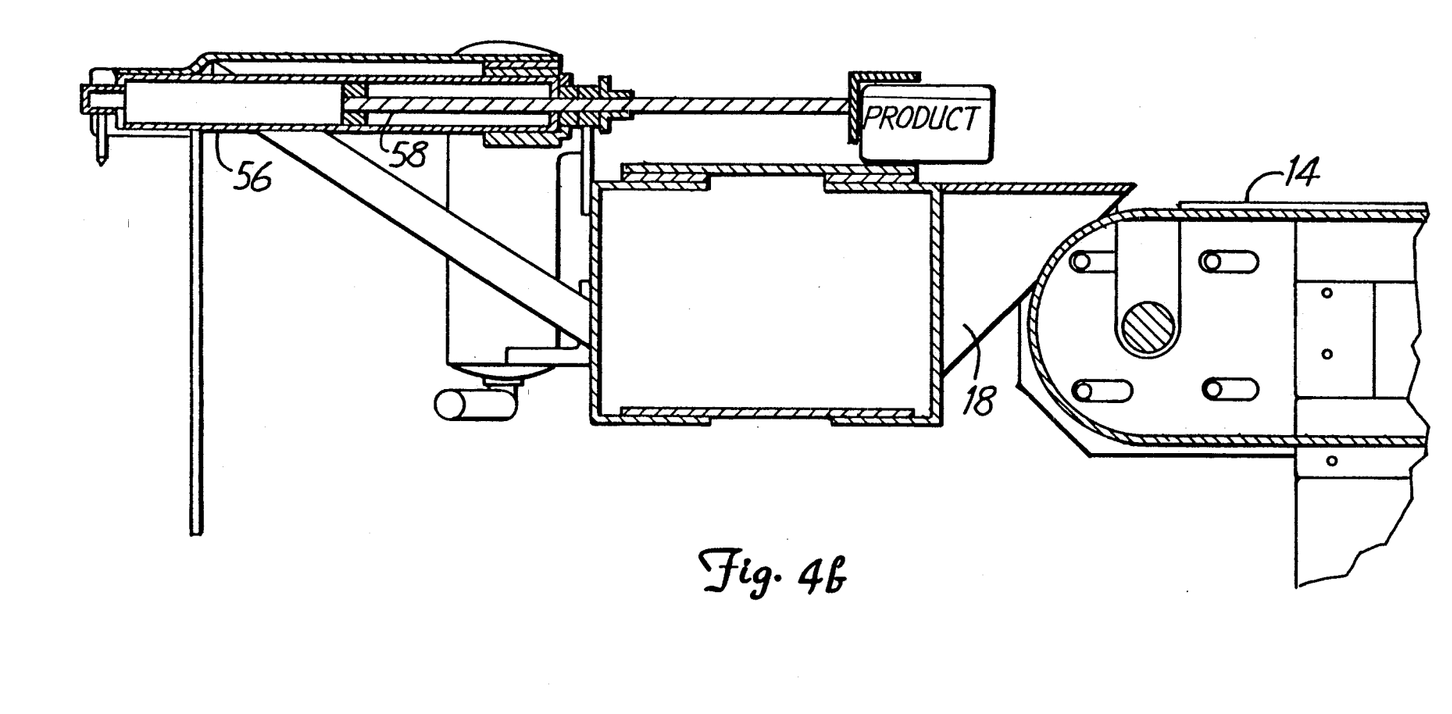
Figure 4E:
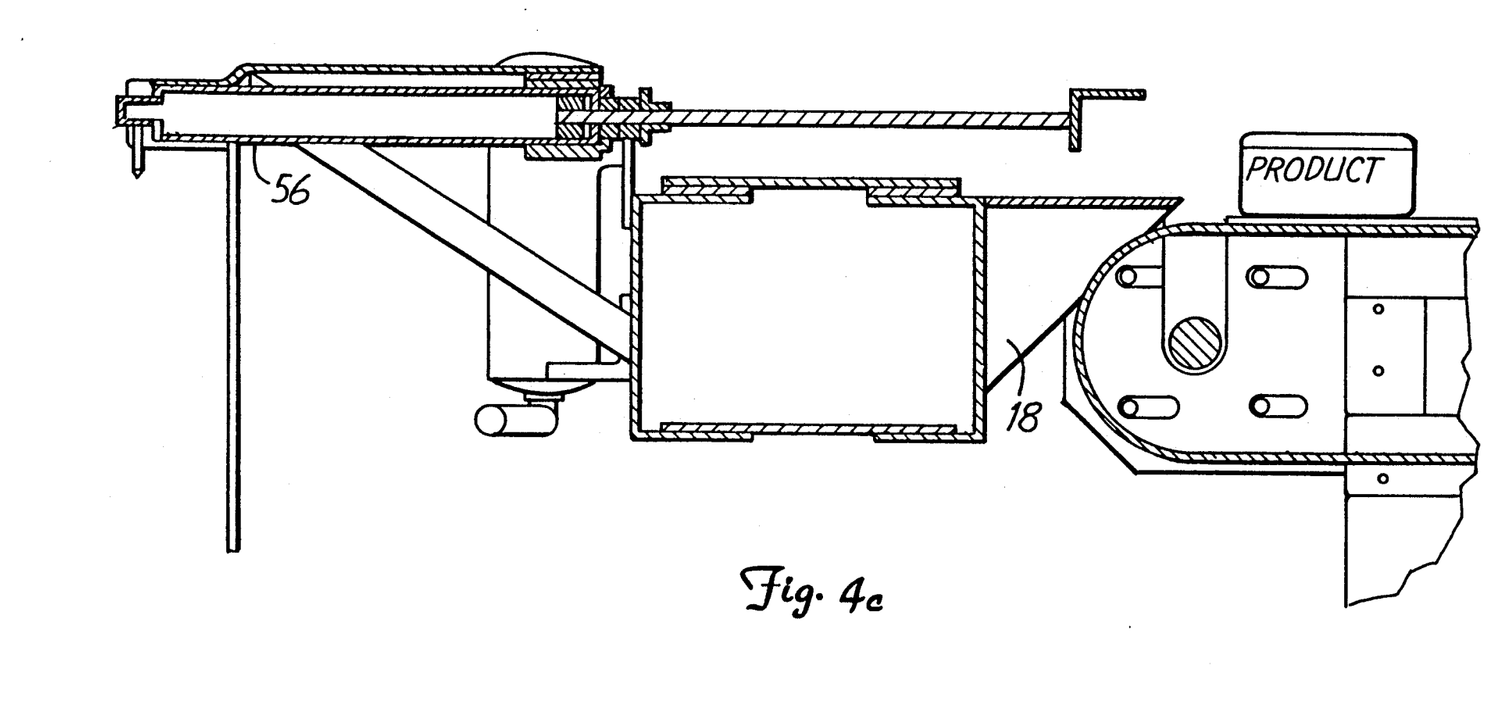

The cylinder 56 is a 12 inch air-driven pneumatic cylinder. The cylinder 56 includes a reciprocating piston 58, which can move back and forth between two extreme positions. The piston 58 is attached at one end to a push bar 60, which is generally elongated and extends a sufficient length to accommodate a predetermined number of products. As best seen in FIGS. 4a–4c, the push bar 60 comprises two portions 61, 62, which intersect to form an inverted L-shape in cross section. The inverted L-shape is advantageous for use in conjunction with approximately square or rectangular products. As the guide rails, 15, 16, "guide" the products to the push bar 60, the products move under the portion 62 and into substantial contact with the portion 61.

The cylinder 64 is a 6 inch air-driven pneumatic cylinder. The cylinder 64 includes a reciprocating piston 66, which can move back and forth between two extreme positions. The piston 66 is attached at one end to an extension bar 68.

As the detection signal is applied to electric hoses 26, 28, the air valve 36 is opened to air lines 50, 54. Compressed air is then introduced into the cylinders 56 and 64 at approximately the same time. This compressed air moves the pistons 58, 66 forward, thereby moving both the push bar 60 and the extension bar 68 forward. The extension bar 68 prevents upstream products from flowing to the transceiver 22. At the same time, the push bar 60 pushes products that have been guided to it across the conveyor belt 10, across the plate 17, and then onto the adjacent conveyor belt 14.

After the pistons 58 and 66 have reached their second extreme positions, the air valve 36 closes the air lines 50, 54, and opens air line 52. Air line 52 carries compressed air to the bottom section of the cylinder 56, thereby forcing the piston 58 back toward its first extreme position, and moving the push bar 60 back to its original position. By closing the air hose to line 54, a vacuum is created in the air cylinder 64, thereby forcing the piston 66 back to its first extreme position, and moving the extension bar 68 back to its original position. The pistons, 58 and 66, remain in their first extreme positions until another detection signal is received by air valve 36 from the central controller 32.

Figure 5:
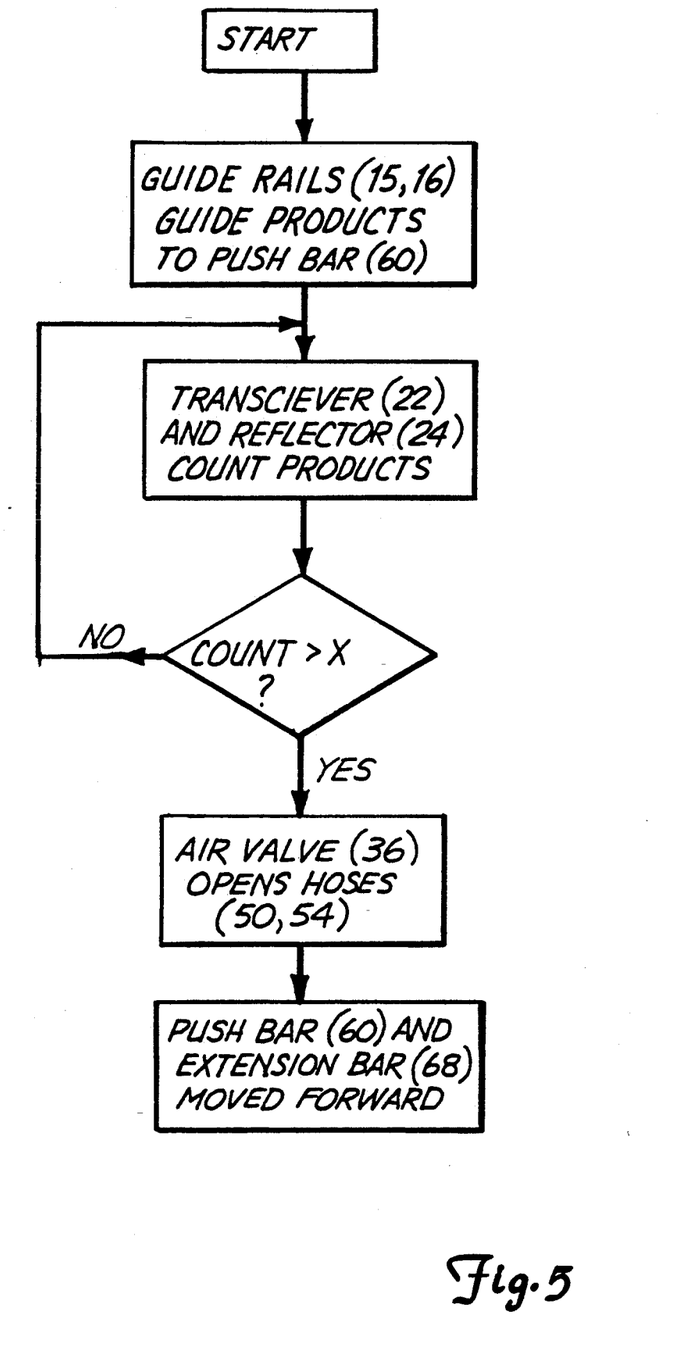
FIG. 5 is a flow chart illustrating the method of the embodiment shown in FIGS. 1-4c.

The disclosed embodiment is further illustrated by the flow chart shown in FIG. 5. As seen in FIG. 5, the guide rails 15, 16 direct products along the push bar 60. The transceiver 22 and reflector 24 count the number of products that pass the transceiver 22. When the preprogrammed number of products have passed, the transceiver 22 then signals the air valve 36 to open air hoses 50, 54, thereby allowing compressed air into the cylinders 56, 64. The compressed air forces the pistons 58, 66 toward their second extreme position.

As the pistons 58, 66 move toward their second extreme position, the push bar 60 and the extension bar 68 are moved over and across the conveyor belt 10. Because the guide rails 15, 16 direct products along the push bar 60, the products are in substantial contact with the push bar 60 when it moves across the conveyor, thus allowing the push bar 60 to "push" the products. This pushing motion is illustrated in FIGS. 4a–4c. The guard rail 70 is located just beyond the push bar 60 to stop products from traveling beyond the push bar 60.

After the pistons 58, 66 have been moved to their second extreme position, the air valve 36 closes air lines 50, 54, and opens air line 52. Thereby, compressed air is introduced into the bottom section of the cylinder 56, forcing the piston 58 and push bar 60 back across the conveyor belt 10. By closing air line 54, a vacuum is created in the cylinder 64, thereby moving the piston 66 and the extension bar 68 back across the conveyor belt 10.

Thus, it can be seen that the transfer apparatus 6 embodying the present invention provides a smooth, efficient and reliable method of transferring products from one conveyor belt to another conveyor belt. By "pushing" the products from conveyor 10, the products do not tumble onto conveyor 14, and the possibility of damage to the product is significantly reduced.

While the above described embodiment of the invention is preferred, those skilled in the art will recognize modifications of structure, arrangement, composition and the like, which do not part from the true scope of the invention. For example, although it is preferred that the products actually touch the push bar 60, it is not absolutely essential that they do so. Thus, the "pushing" motion may be achieved if the product is close enough to the push bar 60 that there is not a significant impact between the product and the push bar 60 when the push bar 60 moves across the conveyor 10. In the disclosed embodiment, it is preferred that the substantial contact between the push bar 60 and the products on the conveyor include a clearance of from approximately ⅛ inch to approximately ¼ inch.

The invention, along with the above-described alternatives and equivalents thereof, is covered by the appended claims.

We claim:

1. An apparatus for transferring objects from a first conveyor to a second adjacent conveyor, the apparatus comprising;
    a first actuator capable of moving from a first extreme position to a second extreme position;
    a push bar attached to said first actuator and located above and adjacent to the first conveyor when said first actuator is in its first extreme position;
    guide means for guiding objects moving on the first conveyor into substantial contact with said push bar;
    detection means located adjacent the first conveyor and upstream from said push bar, said detection means capable of generating a detection signal when an object on the first conveyor passes a predetermined point, said detection signal coupled to said first actuator, whereby said detection signal activates said first actuator to move from its first extreme position to its second extreme position when the objects are in substantial contact with said push bar;
    whereby, movement of said first actuator from its first extreme position to its second extreme position moves said push bar over the first conveyor, thereby pushing objects from the first conveyor to the second conveyor;
    a second actuator capable of moving between a first extreme position and a second extreme position;
    said second actuator located adjacent the first conveyor and upstream from said detection means; and
    an extension bar attached to one end of said second actuator, whereby movement of the said second actuator from its first extreme position to its second extreme position moved said extension bar over the first conveyor, thereby preventing any object on the first conveyor from moving past said extension bar and further whereby said first actuator and said second actuator act simultaneously.

2. The apparatus defined in claim 1 wherein said actuator comprises:
    a first piston;
    a first cylinder for housing said first piston; and
    a first valve having an output port connected to one section of said first cylinder and an input port capable of being connected to a source of compressed air such that, when said first valve is activated, compressed air can be introduced into said one section of said first cylinder, thereby moving said first piston.

3. The apparatus defined in claim 1 wherein the second conveyor moves in a direction perpendicular to the first conveyor.

4. The apparatus defined in claim 1 wherein said detection means comprises:
    a photoelectric emitter for transmitting light signals; and
    a reflector positioned in the path of said light signals for detecting said light signals and reflecting said light signals back to said emitter.

5. The apparatus defined in claim 1 wherein said detection means comprises means for counting the number of objects detected on said first conveyor and generates said detection signal after counting a predetermined number of objects.

6. The apparatus defined in claim 1 wherein said guide means comprises at least one guide rail located adjacent the first conveyor and upstream from said push bar to guide objects moving on the first conveyor into substantial contact with said push bar.

7. The apparatus defined in claim 1 further comprising at least one guard rail located above the first conveyor and downstream from said push bar, whereby objects on the first conveyor are prevented from traveling completely past said push bar.

8. The apparatus defined in claim 1 wherein said detection signal also activates said second actuator to move from its first extreme position to its second extreme position.

9. The apparatus defined in claim 1 wherein said second actuator further comprises:
    a second piston;
    a second cylinder for housing said second piston;
    a second valve having an output port connected to one section of said second cylinder and an input port capable of being connected to a source of compressed air such that, when said second valve is activated, compressed air is introduced into said one section of said second cylinder, thereby moving said second piston.

10. The apparatus defined in claim 1 wherein the second conveyor moves in a direction perpendicular to the first conveyor.

11. A method for transferring an object from a first conveyor to a second conveyor comprising the steps of:
    generating a detection signal when an object on the first conveyor passes a predetermined point;
    guiding the object moving on the first conveyor into substantial contact with a push bar;
    moving said push bar over the first conveyor, thereby pushing the object into the second conveyor in response to said detection signal; and
    providing an extension bar attached to an actuator upstream of the detection signal generation that prevents an object from moving past the extension bar when moved over the first conveyor, whereby the push bar and the extension bar move substantially simultaneously.

12. The method defined in claim 11 further comprising the step of moving the second conveyor in a direction perpendicular to the first conveyor.

13. The method defined in claim 11 further comprising the step of: counting the number of objects that pass a predetermined point; and generating said first detection signal after counting a predetermined number of objects.

14. The method defined in claim 11 further comprising the step of providing at least one guide rail for guiding an object moving on the first conveyor into substantial contact with said push bar.

* * * * *